United States Patent [19]

Smith

[11] 4,440,716
[45] Apr. 3, 1984

[54] IN-SITU CALIBRATION OF LOCAL POWER MEASURING DEVICES FOR NUCLEAR REACTORS

[75] Inventor: Robert D. Smith, Bethesda, Md.
[73] Assignee: Scandpower, Inc., Bethesda, Md.
[21] Appl. No.: 230,027
[22] Filed: Jan. 30, 1981
[51] Int. Cl.³ ............................................. G21C 17/00
[52] U.S. Cl. ........................................ 376/247; 374/1
[58] Field of Search .................... 73/1 F; 136/233; 376/247; 219/499, 502

[56] References Cited

U.S. PATENT DOCUMENTS

| 3,599,474 | 8/1971 | Brown et al. | 136/233 |
|---|---|---|---|
| 3,632,985 | 1/1972 | Bare et al. | 219/499 |
| 4,031,355 | 6/1977 | Leonik, Jr. | 219/502 |
| 4,298,430 | 11/1981 | Rolstad et al. | 376/247 |
| 4,313,792 | 2/1982 | Smith | 376/247 |

FOREIGN PATENT DOCUMENTS

| 8648 | 3/1980 | European Pat. Off. | 376/247 |
|---|---|---|---|
| 1406368 | 9/1964 | France | 376/247 |
| 1085677 | 10/1967 | United Kingdom | 376/247 |
| 333606 | 4/1972 | U.S.S.R. | 376/247 |

OTHER PUBLICATIONS

Gamma Thermometer Developments, for LWR, Leyse et al. (10/78), pp. 1-10.

Primary Examiner—Sal Cangialosi
Attorney, Agent, or Firm—Eric P. Schellin

[57] ABSTRACT

An electrical heater cable is positioned within an assembly of multiple junction thermocouple cables associated with the elongated gamma heated body of a local power measuring unit to electrically heat the body from an external source during a calibration period. The signal outputs of the thermocouples are measured during the calibration period for steady state analysis of the signal response to changes in heating rate produced either by additional electrical heating, by abrupt termination of electrical heating or by supply of sinusoidally varied heating current to the heater cable.

16 Claims, 11 Drawing Figures $f\tau = 1/2\pi f$

IN-SITU CALIBRATION OF LOCAL POWER MEASURING DEVICES FOR NUCLEAR REACTORS

BACKGROUND OF THE INVENTION

This invention relates to the calibration of gamma sensors and more particularly to in-reactor recalibration of such instruments.

Much effort has been devoted to in-reactor calibration of power sensing instruments not capable of being calibrated outside the reactor. Because such instruments require frequent in-core recalibration, expensive traveling fission chamber systems involving traveling in-core probes are utilized to relate signals from many fixed sensors to the signal from a single sensor positioned adjacent to each and every fixed sensor in the reactor. While many local nuclear power measuring devices must likewise be frequently recalibrated, the power measuring devices disclosed in prior copending application, Ser. No. 888,881, filed Mar. 21, 1978, now U.S. Pat. No. 4,298,430 issued Nov. 3, 1981 are so constructed as to provide for calibration at the point of manufacture. In this type of power measuring device, radial heat flow paths extend through a gamma radiation heated body between the internal surface of an inner bore, housing the thermocouple sensors, to the external cylindrical surface of the body. Thermal resistance gaps in the external surface of the body produce localized directional changes in the radial heat flow paths as explained in the aforesaid patent to thereby produce differential output signals from the thermocouple sensors. Thus, such power measuring devices feature an elongated heat conductive body that is also electrically conductive to enable electrical resistance heating to be utilized for calibration prior to installation in a nuclear reactor. Nevertheless, recalibration is still desirable for such pre-calibrated instruments to ensure that sensitivity remains constant. It would therefore be desirable to remove such power measuring units from the reactor periodically to repeat the same calibration procedure performed prior to installation. However, such recalibration procedure is not practicable because the unit becomes extremely radioactive after in-reactor service and cannot be safely handled.

It is therefore an important objective of the present invention to provide economical apparatus and method for recalibration of power measuring units that have been precalibrated by resistance heating without removal from a nuclear reactor installation.

SUMMARY OF THE INVENTION

In accordance with the present invention, an elongated calibration heater cable is installed within the array of multiple junction thermocouple cables positioned within the elongated heat conductive body of a local power monitoring unit that is heated by gamma radiation to produce a differential temperature signal output from the thermocouples because of directional changes in heat flux paths reflecting the amount of heat generated by the gamma radiation. The unit while precalibrated by electrical resistance heating of the heat conductive body prior to installation, may be recalibrated by introducing current from an external source to the heater cable for additional heating of the gamma ray absorbing body producing a signal response in the output of the thermocouples. Measurement and steady state analysis of such signal response during a calibration period enables one to determine the current sensitivity of the unit.

The heater cable has an outer stainless steel jacket enclosing a nichrome heating element embedded in an insulating medium. Current from the external source is therefore conducted through the heating element during the calibration period. A return current path is established either by a separate copper conductor in the cable or through the jacket itself.

According to one embodiment of the invention, the heating current supplied increases the heating rate to a new equilibrium value which is the sum of heating due to gamma absorption and heat added electrically. The signal response to the change in heat rate is linear so that the signal response versus heat added electrically is sufficient to characterize the response over the region of pure gamma heating. Also when the added heating is abruptly terminated to produce a signal drop from the thermocouple, such change in signal is suitable for accurate determination of sensitivity by analysis of response time to which sensitivity is related. Alternatively, the heating current supplied may be varied sinusoidally at a changing frequency and a transfer function extracted from a corresponding signal response. Analysis of such transfer function also yields an accurate in-situ determination of sensitivity.

BRIEF DESCRIPTION OF THE DRAWING FIGURES

DETAILED DESCRIPTION OF PREFERRED EMBODIMENTS

Figure 1:
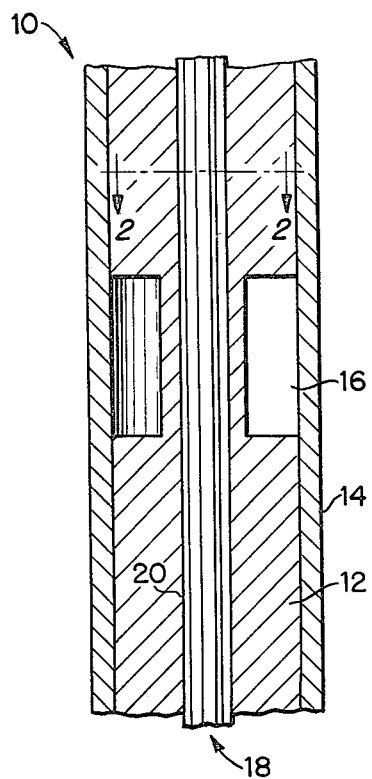
FIG. 1 is a partial side section view through a local power rate monitoring unit, with which the present invention may be associated.

Referring now to the drawings in detail, FIG. 1 illustrates a typical installation with which the present invention is associated, as disclosed in greater detail in the prior copending application aforementioned. Briefly, the installation is a local power monitoring unit, generally referred to by reference numeral 10, within the fuel rod assembly of a pressure water type of nuclear reactor. The power monitoring unit includes an elongated thermally conductive body 12 enclosed within a tubular jacket 14. Thermal resistance regions 16 are formed in the body 12 within axially spaced measurement zones at which differential temperature signals are obtained through a multiple junction thermocouple assembly 18 extending through a central bore 20 within the body 12. The unit 10 may be calibrated prior to installation in its radioactive environment either by direct electrical resistance heating of the body 12 as disclosed in the prior copending application aforementioned or by measurement of the rate of signal change in the signal output of the differential thermocouples 18 in response to sudden cooling of a uniformly heated unit. Recalibration to insure constant sensitivity of the unit 12 to heating, is performed in-situ in accordance with the present invention to avoid withdrawal of the unit from the reactor and handling thereof in its highly radioactive state after in-reactor service.

Figure 2:
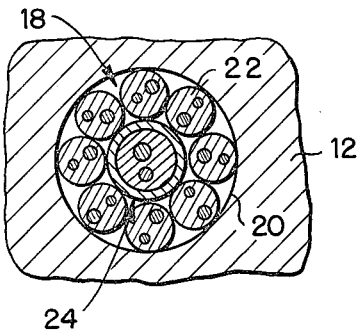
FIG. 2 is a transverse section view taken substantially through a plane indicated by section line 2—2 in FIG. 1.

As is more clearly seen in FIG. 2, the thermocouple assembly 18 includes an array of double junction thermocouple cables 22 respectively extending to the measurement zones through a cavity in the body 12 formed by the central bore 20. The thermocouple cables are grouped around a calibration heater cable 24 centrally positioned within the bore 20. The heater cable 24 imparts additional heating to the body 12 through the internal surface forming the bore 20 at each of the measurement zones during a calibration period and is energized from an external electrical current source.

Figure 3:
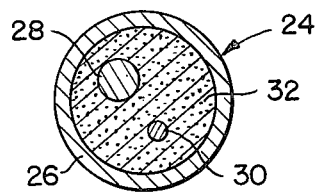
FIG. 3 is an enlarged section view of the heater cable shown in FIG. 2.

In accordance with one embodiment of the invention as shown in FIG. 3, the heater cable has an outer jacket 26 made of stainless steel and an inner electrical resistance heating element 28 in the form of nichrome wire. A return current path is established by a copper conductor 30. Both the nichrome wire and copper conductor are embedded within an insulating medium 12 in the form of aluminum oxide. The nichrome wire heating element has an outside diameter of 0.15 mm. The copper wire is 0.1 mm in diameter and the stainless steel jacket has a diameter of 1.0 mm, by way of example. Heating rates of up to 5 watts per centimeter cable length may thereby be provided.

Figure 4:
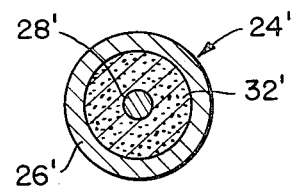
FIG. 4 is a transverse section view through a modified form of heater cable.

FIG. 4 illustrates another embodiment wherein a heater cable 24' is utilized having only a nichrome heater element 28' embedded within the insulating medium 32'. The current return path is established through the outer stainless steel jacket 26'. In this embodiment, heating rates up to 10 watts per cm may be provided.

Figure 5:
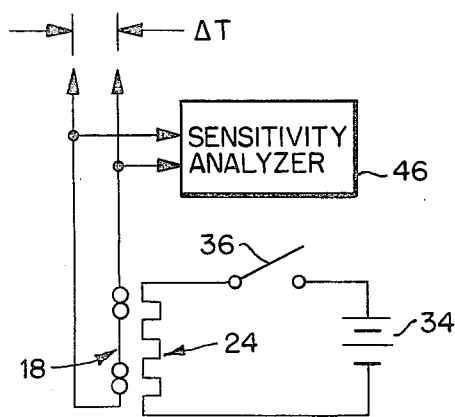
FIG. 5 is a simplified electrical circuit diagram illustrating one method of in-situ calibration in accordance with the present invention.
Figure 6:
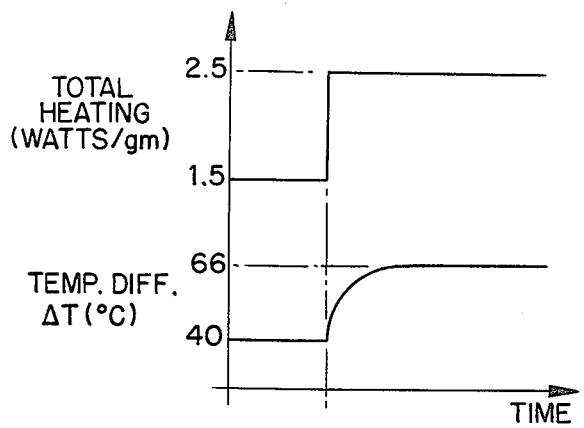
FIGS. 6 and 7 are graphical illustrations of the signal responses obtained during the calibration procedures associated with the embodiment of FIG. 5.
Figure 7:
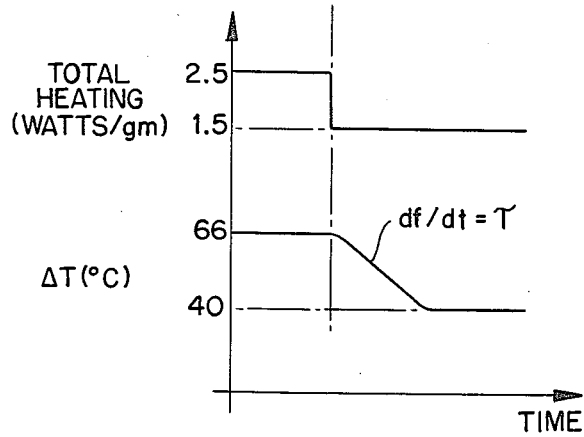

FIG. 5 diagrammatically illustrates the calibration heater 24 positioned adjacent the thermocouple assembly 18 to provide additional heating from an external current source 34 under control of a switch 36. A signal output denoted ($\Delta T$) is ordinarily obtained from the thermocouple 18 by virtue of gamma heating as aforementioned. Additional heating during an in-situ calibration period is obtained by closing a switch 36 as graphically depicted by curve 38 in FIG. 6. A corresponding increase in the differential signal output ($\Delta T$), from 40° C. to 66° C. for example, is obtained as depicted by curve 40 in Figure. The signal change reflected by curve 40 provides a measure of sensitivity, such as 22° C. per watt per gram, which may be determined from the magnitude of the signal response portion of the curve 40. However, recalibration measurement of sensitivity may be effected in an alternate manner during the calibration period by abruptly terminating additional heating after the increased equilibrium heat rate is attained. Such abrupt termination of the additional heating by opening of switch for example, is graphically depicted by curve 42 in FIG. 7 which also shows curve 44 depicting a corresponding signal response in the signal output ($\Delta T$) of the thermocouple. The slope of the signal response portion of curve 44 may be measured through a voltmeter as diagrammatically illustrated in FIG. 5 to determine sensitivity. The analyzer may be any suitable computer system utilizing a computer code which relates response time and sensitivity.

Figure 8:
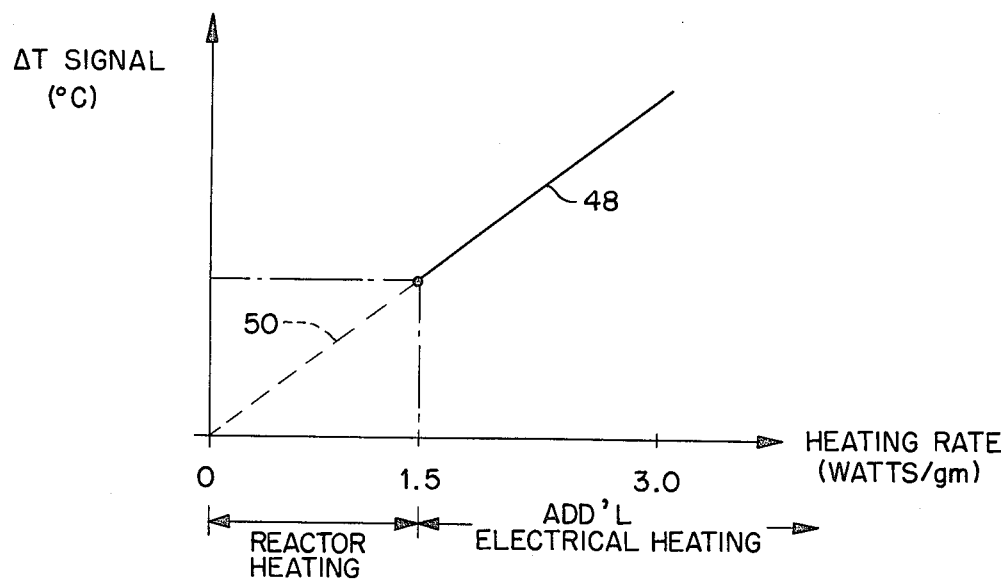
FIG. 8 is a graph of the calibration curve obtained from the data plotted in the graphs of FIGS. 6 and 7.

From the data obtained during additional electrical heating, the ($\Delta T$) signal was plotted against heating rate to obtain a sensitivity function for the sensor as shown by curve 48 in FIG. 8. Since the curve 48 exhibited linearity, it was extrapolated along dotted portion 50 to extend the determined sensitivity for the sensor during reactor heating. The calibration procedure could be performed during zero reactor power conditions in which case no extrapolation of curve 48 would be necessary.

Figure 9:
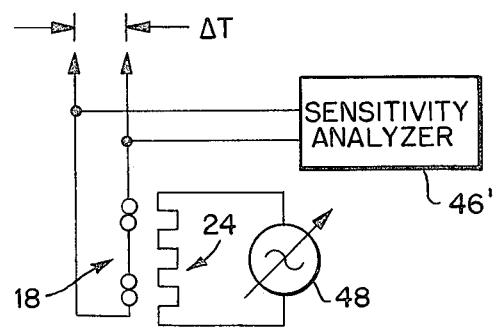
FIG. 9 is a simplified circuit diagram illustrating another method of calibration.
Figure 10:
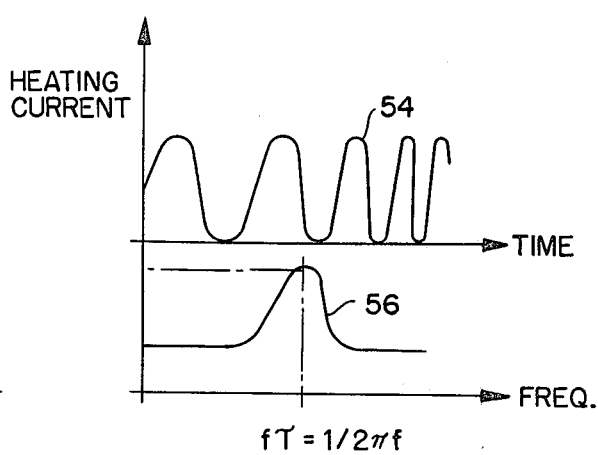
FIG. 10 is a graphical illustration of the signal responses associated with the embodiment of FIG. 9.
Figure 11:
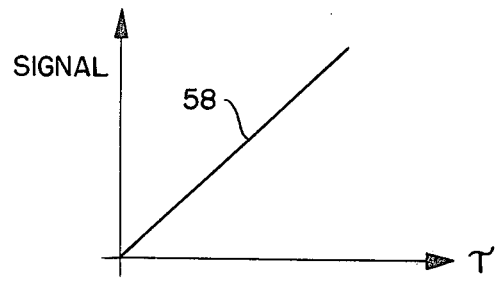
FIG. 11 is a graph of the calibration curve obtained from the data plotted in the graphs of FIG. 10.

FIG. 9 illustrates an alternative method of recalibration wherein the external current source of energy for the heater 24 is derived through an oscillator 52 supplying a sinusoidal current of varying frequency as depicted by curve 54 in FIG. 10. A transfer function ($\tau$) derived from curve 56 in FIG. 10, is extracted from the signal response to the sinusoidal heating current applied to heater 24 during the calibration period. Analysis of this transfer function through analyzer 46' yields an accurate determination of sensitivity of the in-reactor unit 10 by plotting the transfer function ($\tau$) against signal as depicted in FIG. 11 to produce a sensitivity function shown by curve 58 utilizing the known relationship between the transfer function and the sensor signal.

What is claimed is:

1. In combination with a local power monitoring unit installed within a nuclear reactor, having an elongated heat conductive body with internal and external surfaces and an array of thermocouple devices enclosed within a cavity formed in the body by said internal surface for measuring temperature differentials produced by directional changes in heat flux paths within the body between said internal and external surfaces at a plurality of spaced measurement zones, means for in-situ calibration of the power monitoring unit comprising an elongated electrical heater mounted with said array of thermocouple devices within the elongated body, and current supply means connected to the heater externally of the reactor for heating the elongated body through the internal surface thereof at the measurement zones during a calibration period to obtain a calibrating change in signal output from the thermocouple devices.

2. The combination of claim 1 wherein the cavity formed by the internal surface of the body is a bore enclosing the heater therein.

3. The in-situ calibration means as defined in claim 1 wherein said elongated body is additionally heated by the heater above heating by gamma radiation to an equilibrium heat rate level, and means for abruptly terminating additional heating by the heater when said equilibrium heat rate level is attained to obtain a corresponding change in signal from the signal output of the thermocouple devices.

4. The in-situ calibration means as defined in claim 1 including oscillator means for sinusoidally varying current supplied to the heater by the current supply means at a varying frequency to obtain a corresponding signal response in the signal output of the thermocouple devices from which a transfer function may be extracted.

5. The in-situ calibration means as defined in claim 1 whereinsaid heater comprises an elongated heating cable positioned centrally between the thermocouple devices for uniform heating thereof.

6. The in-situ calibration means as defined in claim 5 wherein said heating cable includes an outer jacket, an inner resistance heating element connected to the external current supply means, and an insulating medium enclosed by the outer jacket within which the resistance heating element is embedded.

7. The in-situ calibration means as defined in claim 4 wherein said outer jacket is made of stainless steel, said heating element is made of nichrome wire and the insulating medium is aluminum oxide.

8. The in-situ calibration means as defined in claim 4 including a current return conductor embedded in the insulating medium and connected to the current supply means.

9. The in-situ calibration means as defined in claim 4 wherein the current supply means is electrically connected to the outer jacket to establish a current return path therethrough.

10. In a method of in-situ calibration of a local power monitoring unit installed within a radioactive environment, having an elongated heat conductive body adapted to be heated by gamma radiation and a thermocouple device mounted in the body from which a differential temperature signal output is obtained as a result of directional changes in heat flux paths within the body, the steps of: electrically heating the body internally thereof from a current source externally of said radioactive environment during a calibration period; varying the current during said calibration period to control said internal heating of the body; monitoring changes in the signal output of the thermocouple device during the calibration period; and analyzing said changes in the signal output to determine a sensitivity function for the power monitoring unit during said internal heating of the body.

11. The method of claim 10 wherein the step of varying the current includes: abruptly terminating said electrical heating after equilibrium at an elevated heating rate is attained; said step of analyzing the changes in the signal output being limited to analysis of the signal response to said termination of the electrical heating.

12. The method of claim 10 wherein the step of varying the current includes: sinusoidally varying the electrical heating at a changing frequency during the calibration period to obtain a corresponding signal response that is monitored and analyzed to extract a transfer function from which a sensitivity function is determined.

13. The method of claim 10 wherein said electrical heating of the body is effected during heating of the body by gamma radiation; and extrapolating the determined sensitivity function to cover said gamma radiation heating alone.

14. The method of claim 10, wherein said electrical heating is effected while there is no heating of the body by the gamma radiation.

15. A heat flux sensor comprising a body of high heat conductive material through which heat flow paths are established between internal and external surfaces thereof, thermal resistance means within said body for effecting a directional change in said heat flow paths, an electrical element within said body, means for passing a variable electrical heating current through said element to heat the body through said internal surface, and differential thermocouple means enclosed in a cavity of said body formed by the internal surface for measuring temperature differentials produced by said directional change in the heat flow paths during the heating of the body by said variable electrical heating current.

16. The heat flux sensor as defined in claim 15 wherein the cavity formed by said internal surface of the body is a bore enclosing the electrical element therein.

* * * * *